Patented Mar. 20, 1951

2,545,962

UNITED STATES PATENT OFFICE 2,545,962

HOMOSULFANILAMIDE SALT OF ASPERGILLIC ACID AND METHOD OF PREPARING SAME

William A. Lott, Maplewood, and Kathryn A. Losee, New Brunswick, N. J., and Max Adler, New York, N. Y., assignors to E. R. Squibb & Sons, New York, N. Y., a corporation of New York No Drawing. Application April 22, 1947, Serial No. 743,204

3 Claims. (Cl. 260—250)

This invention relates to pharmaceuticals; and it has for its object the provision of advantageous pharmaceuticals essentially comprising combinations of certain chemotherapeutic agents and certain antibiotics, and methods of obtaining such pharmaceuticals.

The pharmaceuticals of this invention essentially comprise a salt-type combination of a chemotherapeutic basic p-aminomethyl-benzene-sulfonamide (especially homosulfanilamide) and an antibiotic capable of forming a salt with an alkali. These salt-type combinations have been found to have both the chemotherapeutic action of the p-aminomethyl-benzene-sulfonamide component and the antibiotic action of the antibiotic component, and, in addition, certain chemical and/or physical properties advantageously utilizable in therapy.

The term "a p-aminomethyl-benzene-sulfonamide," as employed herein, means a member of the genus composed of homosulfanilamide (also known as α-amino-p-toluene-sulfonamide) and its derivatives. This genus comprises compounds described in U. S. Patent 2,288,531, dated June 30, 1942, including compounds of the formula:

wherein R is a member of the class consisting of hydrogen, alkyl, phenylalkyl, hydroxyalkyl, alkoxyalkyl, carboxylic acid acyl, and heterocyclic groups. Thus, the genus comprises such compounds as homosulfanilamide; 2-(p-aminomethyl-benzene-sulfonamido)-pyridine; 2-(p-aminomethyl-benzene-sulfonamido)-thiazole; 2-(p-aminomethyl-benzene-sulfonamido)-pyrimidine; and 2-(p-aminomethyl-benzene-sulfonamido)-4,6-dimethyl-pyrimidine.

The expression "an antibiotic capable of forming a salt with an alkali" means a member of the genus composed of acidic antibiotics and amphoteric antibiotics capable of forming a salt with an alkali.

The salt-type combinations of this invention may be obtained by a method essentially comprising interacting, in a solvent for the reactants, a basic p-aminomethyl-benzene-sulfonamide and an antibiotic capable of forming a salt with an alkali; or by a method essentially comprising interacting in an aqueous medium (1) a water-insoluble salt obtained by reacting a basic p-aminomethyl-benzene-sulfonamide with an acid and (2) a water-soluble salt obtained by reacting an antibiotic with an alkali (desirably, the cation of the alkali and the anion of the acid being selected from those forming water-insoluble salts with each other).

When prepared in aqueous solution, the solution of the salt-type combination initially obtained (after separation of any precipitate and suitable adjustment of the concentration) may be therapeutically used as such, inasmuch as any excess or unreacted components of the reaction mixture would not interfere with such use. Also, for the same reason, any product recovered from either aqueous or non-aqueous solution and containing excess or unreacted components can be therapeutically used without purification.

The thus-obtained homosulfanilamide salt of acid-penicillin-G, for example, has both the chemotherapeutic action of homosulfanilamide and the antibiotic action of penicillin G. The salt is especially suitable for the topical treatment of infected traumatized areas, being active against the following organisms, inter alia: Gram-positive bacteria, e. g., *Staphylococcus aureus*, and *Clostridium welchii*; Gram-negative bacteria, e. g., *Klebsiella pneumoniae* (Friedländer bacillus); and acid-fast bacteria, e. g., *Mycobacterium tuberculosis* (variety *hominis*).

The antibiotic employed in the practice of this invention may be either pure or crude and either naturally (fermentation) derived or synthetic. Preferably, the crude antibiotic is of such purity as to be therapeutically-utilizable per se.

The following examples are illustrative of the invention:

EXAMPLE 1

*Preparation of the homosulfanilamide salt of aspergillic acid*

1.12 g. aspergillic acid is dissolved in 12 ml. absolute alcohol; 0.93 g. homosulfanilamide is dissolved in 20 ml. hot absolute alcohol; and the two solutions are mixed and allowed to stand for 12–16 hours. The alcohol is then removed by evaporation under reduced pressure. The residue, the homosulfanilamide salt of aspergillic acid, melts at 30–40° C. (yield 1.8 g.).

EXAMPLE 2

*Preparation of the homosulfanilamide salt of acid-penicillin-G*

356.2 mg. (0.001 mol) crystalline sodium-penicillin-G and 222.6 mg. (0.001 mol) homosulfanilamide hydrochloride are dissolved in 0.4 ml. water. Crystallization is then induced (by scratching with a glass rod); and the mass of crystals formed after a short time is triturated with a small amount of water (to remove the sodium chloride formed), collected by filtration, washed with a small amount of water, and dried in vacuo over phosphorus pentoxide at room temperature. The product, the homosulfanilamide salt of acid-penicillin-G, is highly water-soluble, and melts at 140° C. (with decomposition).

The homosulfanilamide salt of acid-penicillin-G is also obtained on interacting homosulfanilamide and acid-penicillin G in an organic solvent for the reactants, and (in better yield) by interacting in an aqueous medium homosulfanilamide sulfate and barium-penicillin-G.

EXAMPLE 3

*Preparation of the homosulfanilamide salt of acid-penicillin-F*

A concentrated aqueous solution of homosulfanilamide sulfate is added to a concentrated aqueous solution of barium-penicillin-F until complete precipitation is obtained. The mixture is then centrifuged and filtered, and the filtrate is freeze-dried, yielding the homosulfanilamide salt of acid-penicillin-F.

On replacement of the homosulfanilamide or homosulfanilamide salt in any of the foregoing examples with any other chemotherapeutic basic p-aminomethyl-benzene-sulfonamide or salt thereof, the corresponding antibiotic salt of the replacing p-aminomethyl-benzene-sulfonamide is obtained; and on replacement of the antibiotic or salt of the antibiotic employed in any of the foregoing examples with any other antibiotic capable of forming a salt with an alkali, or alkali salt of such antibiotic, the homosulfanilamide salt of the particular antibiotic is obtained. Among such other antibiotics (and salts thereof) utilizable in the practice of this invention are acid-penicillin-K and barium-penicillin-X.

The salt-type combinations of this invention are therapeutically utilizable wherever therapy with the p-aminomethyl-benzene-sulfonamide component thereof is indicated (with the advantage of being more generally effective, because active against a wider variety of organisms); especially, wherever therapy with both the p-aminomethyl-benzene-sulfonamide component and the antibiotic component is indicated. These salt-type combinations are especially adapted for dusting (in the powder form obtained on freeze-drying) on or into wounds (including burns), and may be mixed for this purpose with the usual inert diluents or carriers (impalpable inert powders); e. g., talc, zinc stearate, or corn starch.

The invention may be variously otherwise embodied within the scope of the appended claims.

We claim:

1. The homosulfanilamide salt of aspergillic acid.

2. The method which comprises interacting, in a solvent for the reactants, homosulfanilamide and aspergillic acid.

3. The method which comprises interacting homosulfanilamide and aspergillic acid in substantially dry alcohol, and removing the alcohol by evaporation under reduced pressure.

WILLIAM A. LOTT.
KATHRYN A. LOSEE.
MAX ADLER.

REFERENCES CITED

The following references are of record in the file of this patent:

UNITED STATES PATENTS

| Number | Name | Date |
| --- | --- | --- |
| 2,324,013 | Moore | July 13, 1943 |
| 2,352,012 | Rosicky | June 20, 1944 |
| 2,446,974 | Chow | Aug. 10, 1948 |

OTHER REFERENCES

Nature, August 1943, pp. 245–246.

Manufact. Chem. and Manufacturing Perfumer, Oct. 1943, vol. 14, No. 10, page 321.

Tsun: Proc. Soc. Exp. Biol. Med., May 1944, pp. 8–11.

Journal American Chem. Soc., Sept. 1944, pp. 1459–1460.

Proc. Soc. Exp. Bio. and Med., Oct. 1944, pp. 149–151.

Journal Am. Med. Assoc., Nov. 4, 1944, page 666.

American Journal of Pharmacy, July 1945, page 253.

Barry et al.: J. Am. Pharm. Assoc. (Sci. Ed.), Sept. 1945, pp. 244–245.

Readers Digest, Nov. 1945, page 39.

Lawrence: J. Bact. vol. 49, pp. 149–150 (1945).